March 10, 1964     A. T. BARAGER     3,124,396
ROLLER SEPARATOR FOR BALL BEARINGS
Filed Nov. 12, 1959     4 Sheets-Sheet 1
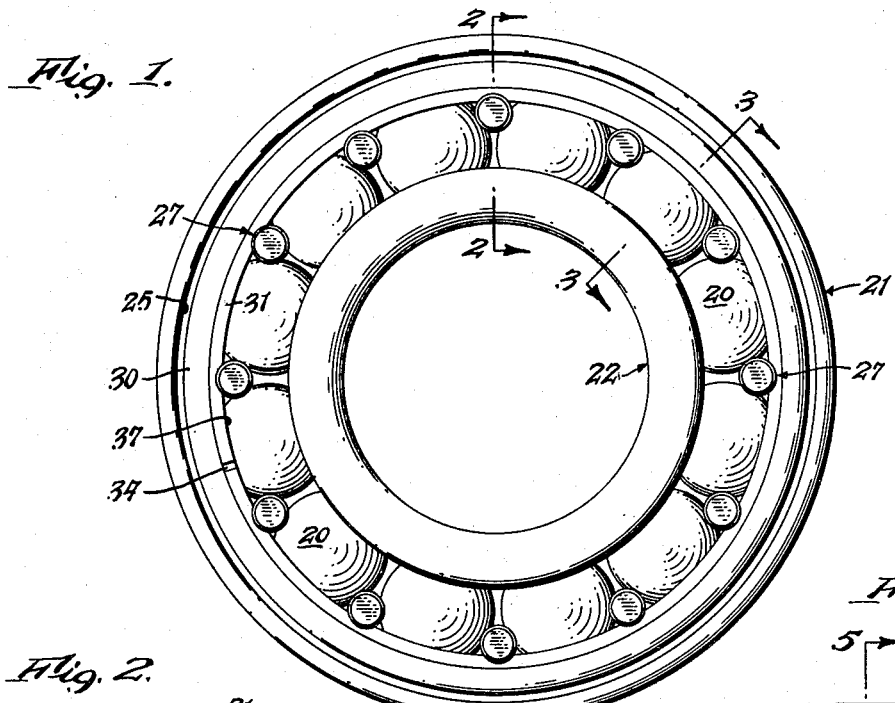
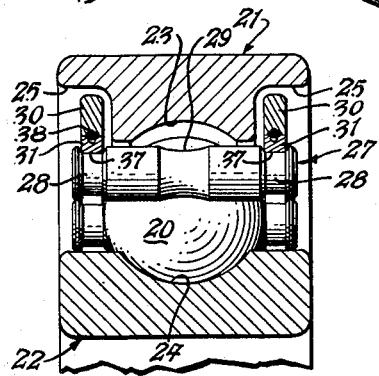
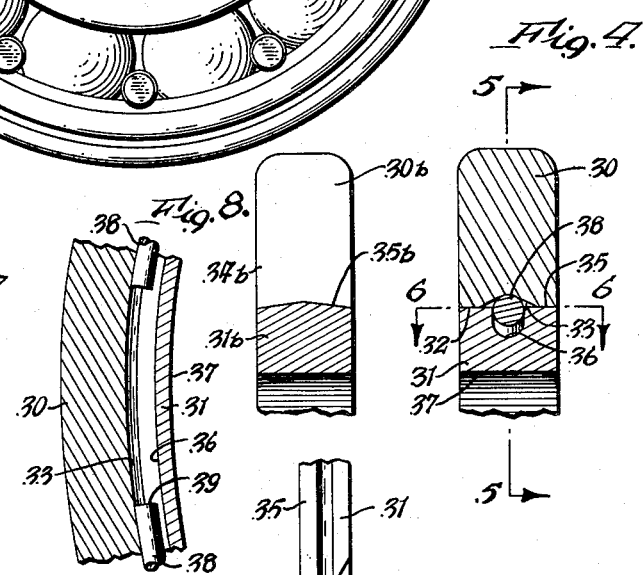
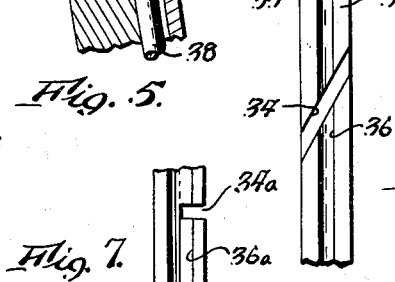
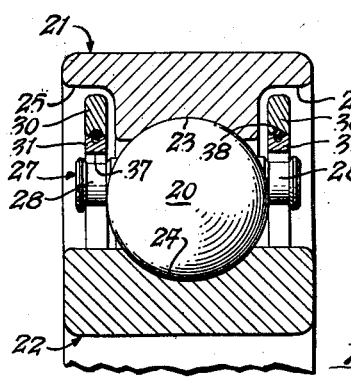
INVENTOR.
Alfred T. Barager
BY Popp and Sommer
Attorneys.

March 10, 1964     A. T. BARAGER     3,124,396
ROLLER SEPARATOR FOR BALL BEARINGS
Filed Nov. 12, 1959     4 Sheets-Sheet 2
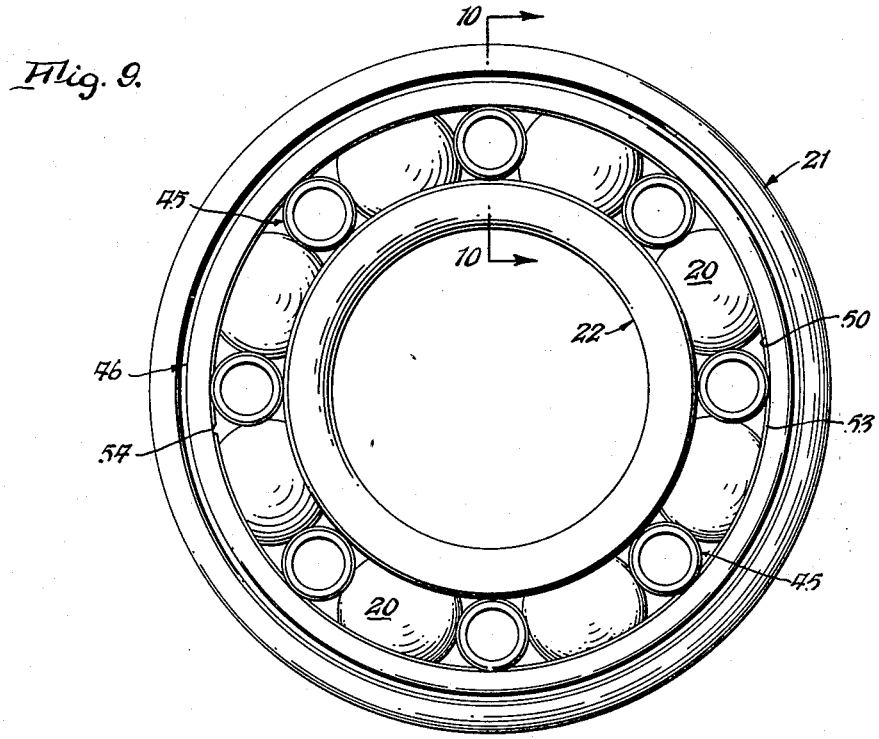
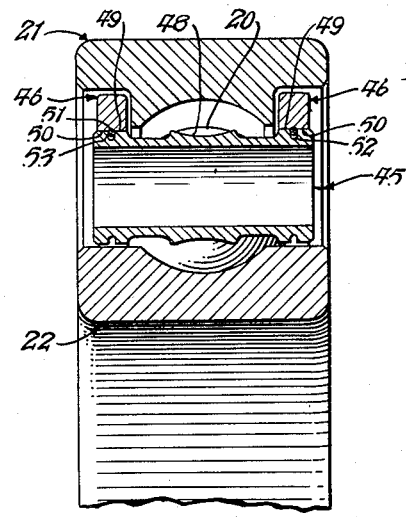
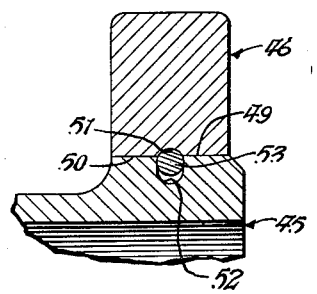
INVENTOR
Alfred T. Barager
BY Popp and Sommer
ATTORNEYS

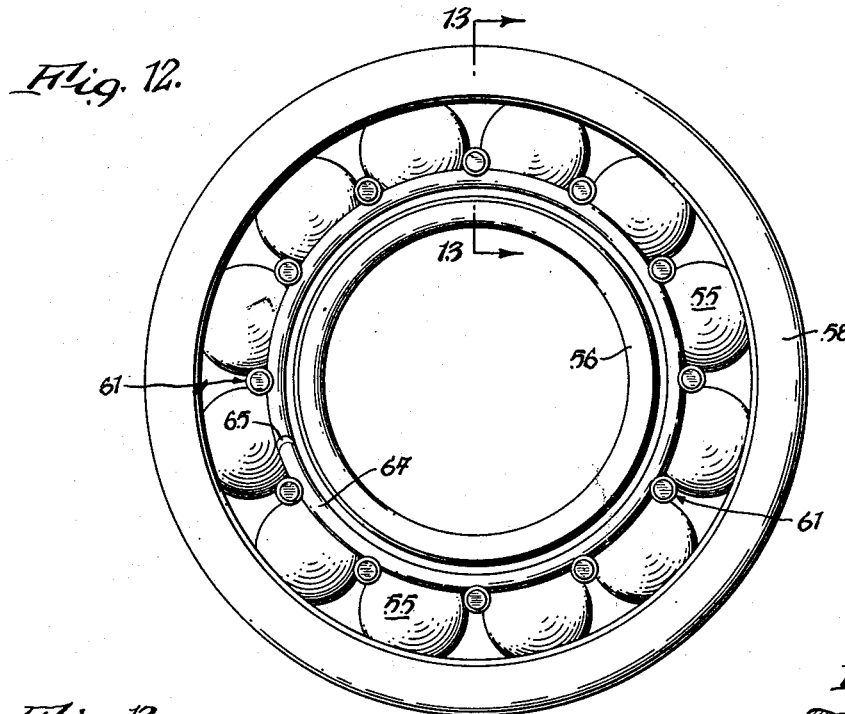
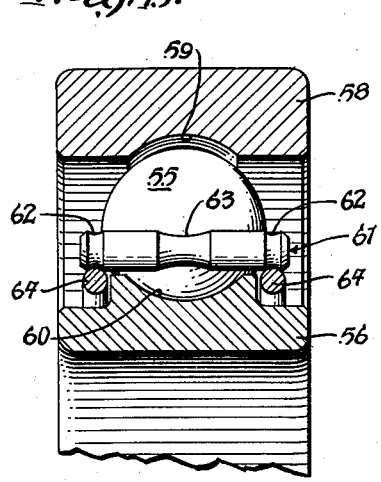
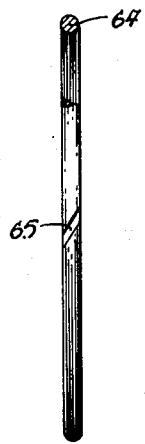
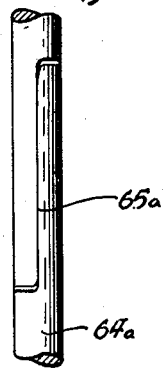

March 10, 1964  A. T. BARAGER  3,124,396
ROLLER SEPARATOR FOR BALL BEARINGS
Filed Nov. 12, 1959  4 Sheets-Sheet 4

INVENTOR
Alfred T. Barager
BY Popp and Sommer
ATTORNEYS

United States Patent Office 3,124,396
Patented Mar. 10, 1964

3,124,396
ROLLER SEPARATOR FOR BALL BEARINGS
Alfred T. Barager, P.O. Box 304, Nunda, N.Y.
Filed Nov. 12, 1959, Ser. No. 852,265
7 Claims. (Cl. 308—200)

This invention relates to rolling separators to replace the usual cage separator in ball bearings and more particularly to such a separator which provides a true rolling action between the relatively movable components of the bearing.

An important object of the invention is to provide a rolling separator which imparts a purely rolling contact between all moving parts of the bearing as compared with the sliding contact of the balls against conventional cage separators.

Another important object is to provide such a rolling separator which can be readily applied to the ball bearing after the bearing has been filled with the balls.

Another object is to provide such a rolling separator which provides positive rolling contact between the rollers of the separator and the balls and is self alining to avoid wobble or other irregularity in action.

Another object is to provide such a rolling separator in which retaining rings are held in predetermined contact with the rollers of the separator at all times.

Another object is to provide such a rolling separator in which the retaining rings have constant contact with all of the rollers.

Another object is to provide such a rolling separator in which the retaining rings can yieldingly bias the rollers against the balls to insure uniform spacing of the rollers and balls as well as to insure positive contact of the moving parts at all times.

Another object is to provide such a rolling separator which is adapted for use with a large or small ball bearing operating at high, slow or moderate speeds and to ball bearings in which the balls are filled with or without the use of a conventional filling notch which permits filling with the maximum number of balls.

Another object is to provide such a rolling separator the components of which are very simple and can be made from standard commercially available material on automatic machines and with a minimum loss of stock.

Another object is to provide such a rolling separator which prevents backlash, insures long life and can be embodied in a ball bearing having as little overall weight is consistant with its intended service.

Another object is to provide a rolling separator which improves the operating efficiency of the ball bearing by the elimination of the slippage or sliding of all relatively movable components of the bearing.

Another object is to provide a rolling separator which provides a cooler running ball bearing.

Other objects and advantages of the invention will be apparent from the following description and drawings in which:

FIG. 1 is a side elevational view of one form of rolling separator embodying my invention, this form of the invention being particularly adapted to a bearing operable at all speeds and having the maximum number of balls and hence having the maximum load carrying capacity.

FIGS. 2 and 3 are enlarged fragmentary radial sectional views taken generally on the correspondingly numbered lines on FIG. 1.

FIG. 4 is a fragmentary still further enlarged radial section view, similar to FIGS. 2 and 3, through one of the two-part retaining rings used in this form of the invention.

FIG. 5 is a fragmentary sectional view taken generally on line 5—5, FIG. 4.

FIG. 6 is a diminutive fragmentary top plan view of the inner part of the two-part retaining ring, this view being taken on line 6—6, FIG. 4.

FIG. 7 is a view similar to FIG. 6 showing a modified form of the inner part of the two-part retaining ring shown in FIGS 1-6.

FIG. 8 is a view similar to FIG. 4 and showing a modified form of the two-part retaining ring.

FIG. 9 is a side elevational view of a ball bearing illustrating a further modification of the invention.

FIG. 10 is a fragmentary enlarged radial section taken generally on line 10—10, FIG. 9.

FIG. 11 is a fragmentary still further enlarged view similar to FIG. 10.

FIG. 12 is a view similar to FIG. 1 showing a further modified form of the invention.

FIG. 13 is a fragmentary enlarged radial section taken generally on line 13—13, FIG. 12.

FIG. 14 is a fragmentary side elevational view of one of the retaining rings in the form of the invention shown in FIGS. 12-13.

FIG. 15 is a fragmentary view similar to FIG. 14 and showing a modified form of the retaining ring.

Figure 16:
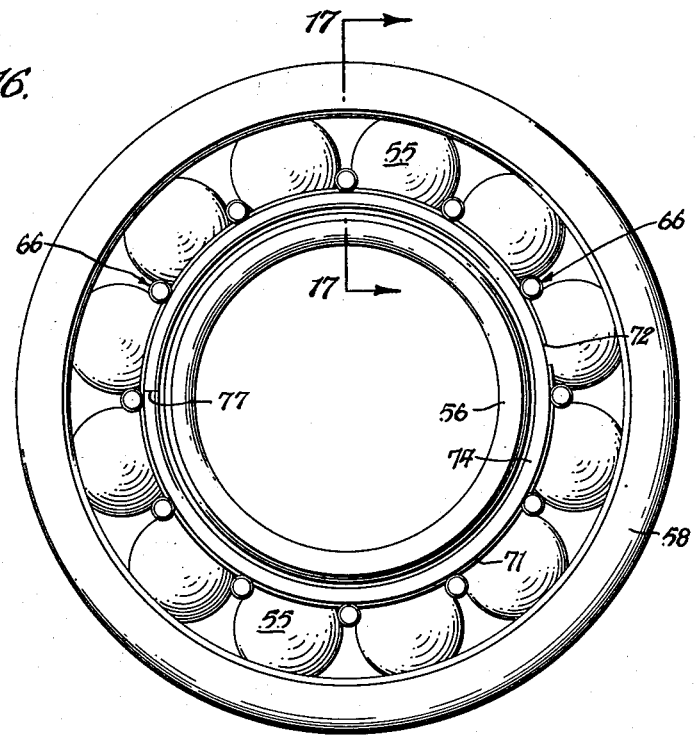
FIG. 16 is a view similar to FIGS. 1, 9 and 12 and showing a further modified form of the invention.

Referring to the form of the invention shown in FIGS. 1-6, the invention is illustrated in conjunction with larger bearings operable at all speeds and having the maximum number of balls 20 interposed between an outer race ring 21 and an inner race ring 22 and hence having the maximum load carrying capacity. The balls 20 can be spaced only a few thousandths of an inch apart and filled or inserted between the two race rings by means of a filling notch (not shown) formed on each race ring, which procedure is well known to those skilled in the art.

The outer race ring 21 has a central internal annular raceway or groove 23 which is circular in cross section and ground to conform to the balls and the inner race ring 22 has a central external annular raceway or groove 24 closely conforming to the balls. A counterbore or recess 25 is formed at each end face of the outer race ring.

The rolling separators for the balls 20 comprise a series of rollers 27 arranged parallel with the axis of the ball bearing in alternation with the balls, and are shown in FIGS. 1-6 as arranged outside of the ring described by the ball centers, that is, between the balls 20 and the outer race ring 21. Each roller 27 is necked or provided with an annular peripheral groove 28 at its opposite ends and is necked or provided at its center with an annular groove 29 which is circular in cross section and ground to a close tolerance to conform to the balls 20.

To provide positive rolling contact between each roller 27 and the pair of balls between which it is interposed without wobble or other eccentric forces, a pair of retaining rings 30, 31 are provided at each side of the ball bearing and have a close rolling fit with the ends of the rollers 27 to hold them in contact with the balls. Each pair of these rings 30, 31 is contained within a corresponding counterbore 25 and the outer ring 30 is in the form of an endless ring which is relatively large in cross section and has a cylindrical bore 32 provided with a central internal annular groove 33. The inner ring 31 is in the form of a split spring ring which is small in cross section as compared with the heavier outer ring, and is cut diagonally to provide a scarf or diagonal gap 34 between its ends. The periphery 35 of this inner split spring ring is ground to closely conform to the bore 32 of the companion outer ring 30 and is provided with a central external annular groove 36. The bore 37 of each inner ring is ground to closely conform to the cylindrical reduced necks or grooves 28 of the rollers 27 and each split spring ring embraces and impresses an inward spring pressure on the ends of the rollers 27 when assembled in the ball bearing. After each inner split spring ring is in place in the grooves or necked ends 28 of the rollers 27, the solid or endless outer ring 30 is slipped axially over the periphery 35 thereof. To maintain the rings 30, 31 in mating relation, the groove 36 of the inner split spring ring is of a depth equal to the cross sectional diameter of the wire forming a locking spring ring 38. This wire locking ring is split, the gap at its ends being indicated at 39, and it is internally biased to an expanded condition. Accordingly, when the rings 30, 31 are brought so that their grooves 33, 36 are in mating relation, the wire locking ring expands into the groove 33 which is of a depth of approximately half the cross sectional diameter of the wire forming the wire locking ring. Accordingly, the rings 30, 31 are locked together by the wire locking ring 38 as illustrated in FIG. 4. The modified form of the invention shown in FIG. 7 is similar to the form shown in FIGS. 1–6 except that the gaps 34a at the ends of the split spring ring 31 are each provided by a parallel sided lap joint 40 instead of by the scarf cut or diagonal gap 34. This ring 31a has an external annular groove 36a and functions in the same manner as the split spring ring 31 in the form of the invention shown in FIGS. 1–6.

The modified form of the invention shown in FIG. 8 is similar to the form shown in FIGS. 1–6 except that the inner split spring ring 31b, instead of having an externally grooved cylindrical periphery, has a periphery 35b which is crowned in cross section to have a protruding portion, that is, is radially thicker at its center than at its sides. The outer ring 30b is split by a straight transverse cut 34b through one side of the ring, and is recessed to have a snug conforming fit to provide a tight grip on the inner split spring ring 31b to add to the contractive biasing of the inner split spring ring and to help hold this inner ring yieldingly against the rollers 27 and overcome the effect of centrifugal force. In other respects the construction of the ball bearing shown in FIG. 8 is the same as with the form of the invention shown in FIGS. 1–6. The ball bearing illustrated in FIG. 8 is designed for slow and moderate speeds.

The form of the invention shown in FIGS. 9–11 is particularly designed to provide a ball bearing in which the filling notches in the two races 21, 22 are eliminated, such filling notches being required in the form of the invention shown in FIGS. 1–6. With the form of the invention illustrated in FIGS. 9–11 the race rings 21, 22 and balls 20 are similar to the form of the invention shown in FIGS. 1–6 except that only eight balls are used as compared with the twelve balls in the form of the invention shown in FIGS. 1–6. By virtue of such small number of balls used, with seven balls in contact with one another at the bottom of the bearing, the tops of the races 21, 22 can be separated far enough to permit the insertion of the eighth ball. Following this, rollers 45 can be inserted alternately among the balls 20 and then brought to operative position in rolling contact with the balls 20 by retaining rings 46 at their opposite ends.

These rollers 45 are of large diameter, having 60% to 80% of the diameter of the balls 20, to provide the necessary wide or distant spacing of these balls. These rollers 45 are preferably made from steel tubing to lessen weight and at their centers are ground to provide an annular groove 48 which is circular in cross-section and ground to a close tolerance to conform to the balls 20. The ends of each roller are accurately finished to provide a cylindrical peripheral surface 49 and the bores 50 of the retaining rings 46, which are in the form of solid or endless heavy rings, are accurately finished to fit snugly against the peripheral surfaces 49 of the series of rollers 45 at each side of the bearing. Each retaining ring 46 is provided with an internal annular groove 51 and each roller 45 is provided at each end with an external annular groove 52 which is in centered relation to the surface 49 and in register with the corresponding groove 51. At each side of the bearing, these grooves 51, 52 jointly receive a split ring wire 53, the gap or joint at the ends of this spring wire being indicated at 54. The spring wire tends to expand into the groove 51 of the corresponding solid retaining ring 46, this groove being approximately half of the cross-sectional diameter of the wire forming the locking ring 53 so that when in position, as best illustrated in FIG. 11, the wire locking ring 53 holds the retaining rings 46 against axial displacement from the rollers 45.

To permit assembly of the parts, the grooves 52 are of a depth equal to the full diameter of the wire forming the wire locking ring 53 so that this locking ring can be contracted into these grooves 52 and the solid retaining ring 46 slipped over the ends of the rollers 45, the wire locking ring 53 snapping outwardly into the groove 51 when this groove comes into register with all of the grooves 52.

The form of the invention shown in FIGS. 12–15 is designed for higher speed and large load capacity, having the maximum number of balls 55 interposed between an inner race ring 56 and an outer race ring 58. The balls 55 can be filled or inserted between the two race rings by means of a filling notch (not shown) formed on each race ring, as with the form of the invention shown in FIGS. 1–6.

The outer race ring 58 has a central annular raceway or groove 59 which is circular in cross section and ground to conform to the balls and the inner race ring 56 has a central annular raceway or groove 60 also closely conforming to the balls.

The rolling separators for the balls 55 comprise a series of rollers 61 arranged parallel with the axis of the ball bearing in alternation with the balls, and are shown as arranged inside of the ring described by the ball centers, that is between the balls 55 and the inner race ring 56. Each roller 61 is necked or provided with an annular groove 62 at its opposite ends and is necked or provided at its center with an annular groove 63 which is circular in cross section and ground to a close tolerance to conform to the balls 55.

To provide positive rolling contact between each roller 61 and the pair of balls 55 between which it is interposed, without wobble or other eccentric forces, a split ring supporting ring 64 is provided at each side of the ball bearing and has close expansive, or outwardly biased, spring rolling fit with the grooved or necked ends of the rollers to urge them outwardly into contact with the balls. Each supporting spring ring 64 is shown as made of round wire to conform to the end grooves 62 of the rollers 61 and the mating ends of this retaining ring spring are shown as scarfed to provide a diagonal gap 65 as illustrated in FIG. 14.

Alternately the supporting spring ring, designated at 64a, FIG. 15, can be provided with a parallel sided sliding lap joint 65a at its opposite ends as shown in FIG. 15.

Figure 18:
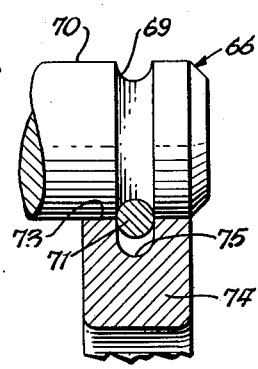
FIG. 18 is a still further enlarged fragmentary view similar to FIG. 17.
Figure 17:
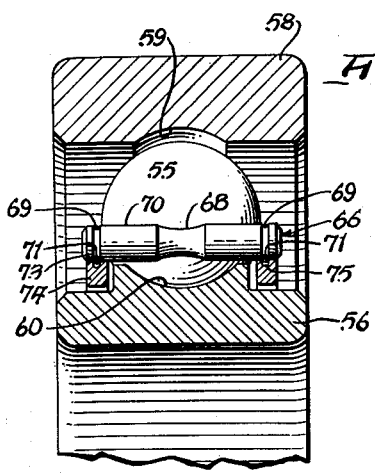
FIG. 17 is a fragmentary enlarged radial section taken generally on line 17—17, FIG. 16.

The form of the invention shown in FIGS. 16–18 follows the form of the invention shown in FIGS. 12–15, being designed for high speed use with large load capacity, having the maximum number of balls 55 interposed between the inner race ring 56 and an outer race ring 58. The balls 55 can be filled or inserted between the two race rings 56, 58 by means of a filling notch (not shown) formed on each race ring, as with the form of the invention shown in FIGS. 1–6.

As with the form of the invention shown in FIGS. 12–15, the outer race ring 58 has a central annular raceway or groove 59 which is circular in cross-section and ground to conform to the balls and the inner race ring 56 has a central annular raceway or groove 60 also closely conforming to the balls.

The rolling separator for the balls 55 comprise a series of rollers 66 arranged parallel with the axis of the ball bearing in alternation with the balls and are shown as arranged inside of the ring described by the ball centers, that is, between the balls 55 and the inner race ring 56. Each roller 66 is necked or provided at its center with an annular groove 68 which is circular in cross-section and ground to a close tolerance to conform to the balls 55. Each end of each roller 66 is also provided with a narrow annular external groove 69 in its periphery 70, these grooves 69 preferably being of a depth approximately half a diameter of the wire of a split spring wire locking ring 71 the gap or joint between the ends of which is indicated at 72.

The peripheral surfaces 70 of the several rollers 66 at each side of the bearing are closely fitted against the periphery 73 of a split supporting ring 74 which serves to hold the rollers yieldingly in rolling contact with the balls 55. The periphery 73 of each supporting ring 74 is slightly larger than the inside diameter of the rollers as a group and thus a slight expansive force of each split ring 74 insures that the rings 74 always roll with the rollers. Each supporting ring 74 is provided with a central annular groove 75 having a depth equal to the diameter of the wire forming the split wire locking ring 71. The depth of this groove permits the assembly of the rolling separator, the wire locking ring 71 being contracted into its groove 75 during assembly and then being permitted to expand, through its internal resilience and tendency to expand, into the several grooves 69. The split for supporting ring 74 is indicated at 77 and is preferably at an angle. The ends of each supporting ring at each split 77 are close together when the rings are in place inside of the series of rollers 66. This prevents backlash of the balls under heavy load. With the rollers 66 on the inside of the ball centers, centrifugal force plays an important part in keeping the rollers under pressure between the balls. The free outside diameter of the lock wire 71 is slightly larger than the inside diameter of the roller grooves 69 as a group, and thus a slight tension on this lock wire when in place insures that the wire always rolls with the rollers.

From the foregoing, it will be seen that the ball bearing of the present invention provides true rolling action between the relatively movable components of the bearing. More particularly, the rotary motion of the balls will cause rotary motion in the opposite direction of the rollers and the rotary action of the rollers will cause rotary motion of the retaining rings. Since the retaining rings have not other means of support other than the rollers they are free wheeling to provide a true rolling action between the ends of the rollers and the rings. This results in a bearing having high operating efficiency since friction or slippage of relatively movable components is avoided and cooler running with reduced wear and reduced requirement for lubrication is provided.

It will also be seen that provision is made for the ready assembly of the rolling separators into the ball bearing and that in each instance a split spring ring is provided to permit the mounting of the retaining rings upon the ends of the rollers. It will further be seen that the provision of such split rings does not interfere with the balance of operating efficiency or the ball bearing and that the invention can be incorporated in ball bearings adapted for high or moderate speed use as well as the maximum number of balls to provide high load carrying capacity as well as with bearings having a smaller number of balls to permit assembly of the balls and races without the use of the usual filling notches.

What is claimed is:

1. In a ball bearing having an outer race ring, an inner race ring concentrically arranged within said outer race ring, said race rings having raceways disposed in opposition, a series of balls arranged between and in the raceways, a series of rollers arranged in alternation and in contact with said balls and being disposed between said series of balls and one of said race rings with their axes parallel with the axis of the ball bearing, each of said rollers being provided at its opposite ends with peripheral annular grooves, and a ring at each end of said rollers and interposed between the ends of said rollers and said one of said race rings, the combination therewith of means retaining said ring on said roller ends, comprising a split ring secured concentrically in each of said first mentioned rings and extending into said grooves to hold said first mentioned rings against axial displacement from said ends of said rollers.

2. In a ball bearing having an outer race ring, an inner race ring concentrically arranged within said outer race ring, said race rings having raceways disposed in opposition, a series of balls arranged between and in the raceways, a series of rollers arranged in alternation and in contact with said balls and being disposed between said series of balls and one of said race rings with their axes parallel with the axis of the ball bearing, each of said rollers being provided at its opposite ends with peripheral annular grooves, and a first ring at each end of said rollers and interposed between the ends of said rollers and one of said race rings, the combination therewith of means retaining said ring on said roller ends, comprising a second ring interposed concentrically between each first ring and the corresponding ends of said rollers and being contained in said grooves of said rollers, said first and second rings being provided with radially opening opposing annular grooves, and a third ring arranged in each pair of said opposing annular grooves and holding said rings against axial displacement from the ends of said rollers, one of said second and third rings being split to be radially distortable.

3. In a ball bearing having an outer race ring, an inner race ring concentrically arranged within said outer race ring, said race rings having raceways disposed in opposition, a series of balls arranged between and in the raceways, a series of rollers arranged in alternation and in contact with said balls and being disposed between said series of balls and one of said race rings with their axes parallel with the axis of the ball bearing, each of said rollers being provided at its opposite ends with peripheral annular grooves, and an endless ring at each end of said roller bearing and interposed between the ends of said rollers and said one of said race rings, the combination therewith of means retaining said endless ring on said roller ends, comprising a split ring secured concentrically in said endless ring and extending into said grooves to hold said endless rings against axial displacement from said ends of said rollers.

4. The combination set forth in claim 3 wherein said split retaining ring is in the form of a spring internally biased to expand radially outwardly.

5. In a ball bearing having an outer race ring, an inner race ring concentrically arranged within said outer race ring, said race rings having raceways disposed in opposition, a series of balls arranged between and in the raceways, a series of rollers arranged in alternation and in contact with said balls and being disposed between said series of balls and one of said race rings with their axes parallel with the axis of the ball bearing, each of said rollers being provided at its opposite ends with peripheral annular grooves, and an endless ring at each end of said roller bearing and interposed between the ends of said rollers and said one of said race rings, each endless ring having rolling contact with the peripheries at the ends of said rollers, the combination therewith of means retaining said endless ring on said roller ends, comprising an annular groove arranged in each of said endless rings in opposition to the grooves of said rollers, and a split retaining ring contained jointly in each of said grooves of said endless rings and the opposing grooves of said rollers and holding said endless rings against axial displacement from said ends of said rollers.

6. In a ball bearing having an outer race ring, an inner race ring concentrically arranged within said outer race ring, said race rings having raceways disposed in opposition, a series of balls arranged between and in the raceways, a series of rollers arranged in alternation and in contact with said balls and being disposed between said series of balls and one of said race rings with their axes parallel with the axis of the ball bearing, each of said rollers being provided at its opposite ends with peripheral annular grooves, and an endless ring at each end of said roller bearing and interposed between the ends of said rollers and one of said race rings, the combination therewith of means retaining said endless ring on said roller ends, comprising a second ring interposed concentrically between each endless ring and the corresponding ends of said rollers and being contained in said grooves of said rollers, said endless and second rings being provided with radially opening opposing annular grooves, and a third ring arranged in each pair of said opposing annular grooves and holding said rings against axial displacement from the ends of said rollers, one of said second and third rings being split to be radially distortable.

7. In a ball bearing having an outer race ring, an inner race ring concentrically arranged within said outer race ring, said race rings having raceways disposed in opposition, a series of balls arranged between and in the raceways, a series of rollers arranged in alternation and in contact with said balls and being disposed between said series of balls and one of said race rings with their axes parallel with the axis of the ball bearing, each of said rollers being provided at its opposite ends with peripheral annular grooves, the combination therewtih of means at opposite ends of said series of rollers to hold said rollers in contact with said balls, comprising a first split ring at each end of said roller bearing and interposed between the ends of said rollers and said one of said rings and being contained in said grooves of said rollers, and a second split ring engaging the surface of each first split ring opposing said one of said race members, the opposing faces of said split rings being provided with mating recess and protruding portions to secure the pairs of split rings together.

References Cited in the file of this patent
UNITED STATES PATENTS

| | | |
|---|---|---|
| 952,358 | Ramslie | Mar. 15, 1910 |
| 1,038,085 | Chubbuck | Sept. 10, 1912 |
| 1,699,713 | Plummber | Jan. 22, 1929 |
| 1,796,616 | O'Connor | Mar. 17, 1931 |
| 2,334,227 | Stallman | Nov. 16, 1943 |
| 2,567,543 | Brell | Sept. 11, 1951 |
| 2,755,698 | Wurzel | July 24, 1956 |

FOREIGN PATENTS

| | | |
|---|---|---|
| 97,055 | Germany | May 26, 1924 |